United States Patent [19]

United States Patent
Perron et al.

[15] 3,696,145
[45] Oct. 3, 1972

[54] NEW PROCESS FOR THE PREPARATION OF 1-INDANCARBOXYLIC ACIDS

[72] Inventors: Yvon G. Perron, St. Lambert, Quebec; James L. Douglas, Greenfield Park, Quebec, both of Canada

[73] Assignee: Britsol-Myers Company, New York, N.Y.

[22] Filed: Sept. 27, 1971

[21] Appl. No.: 184,307

[52] U.S. Cl............260/515 R, 260/284, 260/346.8, 260/469, 260/473 A, 260/501.18
[51] Int. Cl................................................C07c 63/44
[58] Field of Search..................................260/515 R

[56] References Cited

UNITED STATES PATENTS 3,565,943   2/1971   Juby et al. .................260/515

*Primary Examiner*—James A. Patten
*Attorney*—Herbert W. Taylor, Jr. et al.

[57] ABSTRACT

Levorotatory 5-cyclohexyl-1-indancarboxylic acid is a useful anti-inflammatory agent in the treatment of inflammatory diseases in animals, including man. As such, a new and more efficient process has been discovered for the preparation of large quantities of the racemic mixture of the compound, ($\pm$)-5-cyclohexyl-1-indancarboxylic acid.

3 Claims, No Drawings

NEW PROCESS FOR THE PREPARATION OF 1-INDANCARBOXYLIC ACIDS

BACKGROUND OF THE INVENTION

1. Field of the Invention

The process of the present invention is a new and more efficient procedure for the preparation of large quantities of (±)-5-cyclohexyl-1-indancarboxylic acid.

2. Description of the Prior Art

The process of the present invention is new and novel and produces yields several fold those obtained by the process described in U.S. Pat. No. 3,565,943.

The art we are acquainted with that is most closely related to that of the process of the instant invention can be found in the following references:

a. K. Kindler, W. Metzendorf and D. Kwok, Berichte 76B, 308 (1943) [Chemical Abstracts 37, 5709 (1954) ] teach the preparation of ethyl(p-cyclohexylphenyl)glyoxylate.

b. C. S. Rondestvedt and A. H. Filbey, J. Org. Chem. 19, 119 (1954) teach a Reformatsky reaction comparable to that employed on ethyl(p-cyclohexylphenyl)glyoxylate.

c. P. Juby, R. Partyka and T. Hudyma, U.S. Pat. No. 3,565,943, report the preparation of (±)-5-cyclohexyl-1-indancarboxylic acid. The last two steps of the process described therein in column 3 are identical to the final steps of this process.

SUMMARY OF THE INVENTION

This invention is a new and novel process for the preparation of the compound having the formula

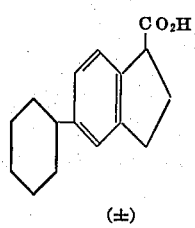

(±)    I which process comprises the consecutive steps of

A. treating cyclohexylbenzene with ethyl oxalyl chloride in the presence of aluminum chloride to produce the compound having the formula

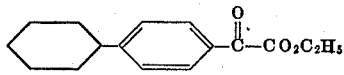

II

B. treating compound II with ethyl bromoacetate in the presence of powdered zinc and a catalytic amount of iodine to produce the compound having the formula

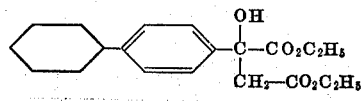

III

C. heating compound III in the presence of polyphosphoric acid to produce the compound having the formula

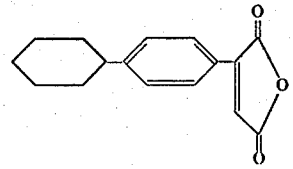

IV

D. hydrogenating compound IV with hydrogen in the presence of Raney Nickel to produce the compound having the formula

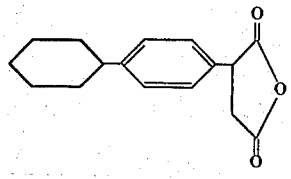

V

E. treating compound V with aluminum chloride to produce the compound having the formula

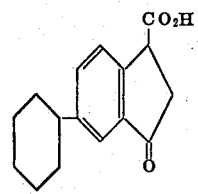

VI

F. reducing compound VI to produce compound I.

DISCLOSURE OF THE INVENTION

This invention relates to a new and novel and more efficient process for the preparation of nonsteroidal anti-inflammatory agents having the name (±)-5-cyclohexyl-1-indancarboxylic acid, and more particularly the compound (−)-5-cyclohexyl-1-indancarboxylic acid which is the more potent isomer (U.S. Pat. No. 3,565,943).

The compound produced by the process are characterized by the formula

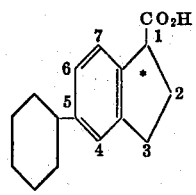

The carbon to which the carboxyl group is attached is an asymmetric carbon atom (*) such that the compounds exist in two isomeric forms; dextro- and levorotatory isomers. Of these two isomers, the levoratory isomer is the most potent isomer as an anti-inflammatory agent. However, the dextrorotatory isomer is also of importance inasmuch as it can be racemized to produce the desired levorotatory isomer.

It was an object of the instant invention to provide a new, novel and more efficient process for the preparation of these compounds, said compounds being useful in the treatment of a variety of inflammatory diseases such as rheumatoid arthritis, rheumatoic spondylitis, osteoarthritis, gout and other similar afflictions.

The process of the instant invention can be illustrated by the following diagram.

STEP A

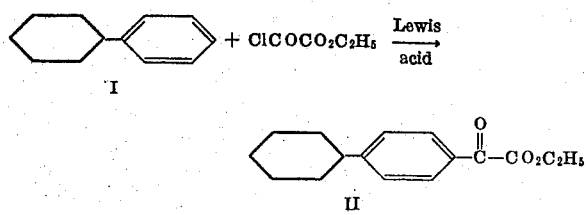

STEP B

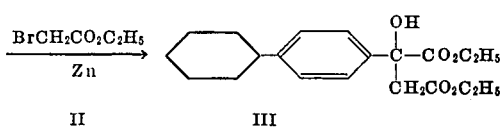

STEP C

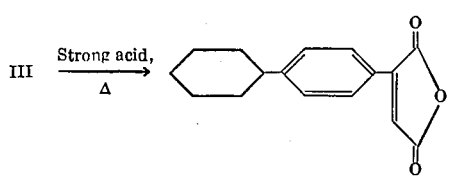

STEP D

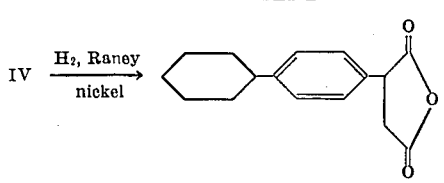

STEP E

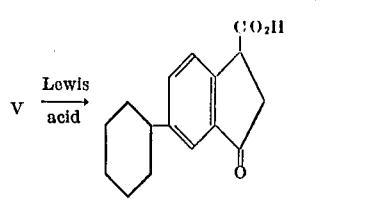

STEP F

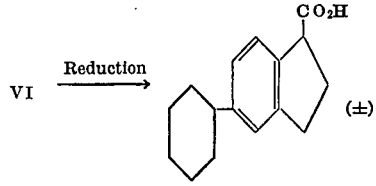

STEP G

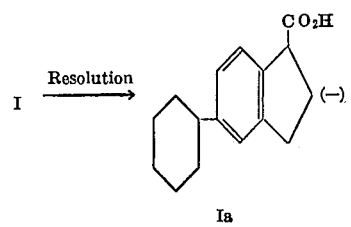

and

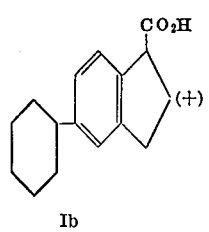

The objectives of the present invention have been achieved by the provision of the process which comprises the consecutive steps of A. mixing ethyl oxalyl halide (chloro, bromo or iodo), but preferably chloro, and cyclohexylbenzene, in a ratio of at least 1 mole of the oxalyl halide per mole of cyclohexylbenzene, but preferably in a ratio of about 1 to 1, in the presence of a Lewis acid catalyst selected from the group comprising $AlCl_3$, $SnCl_4$, $FeCl_3$, $TiCl_4$ and $ZnCl_2$, but preferably $AlCl_3$, in a ratio of at least 1 mole of catalyst per mole of cyclohexylbenzene, but preferably in a ratio of about 1.2 to 1, in the presence of an organic solvent essentially inert to the reaction conditions selected from the group comprising carbon tetrachloride, carbon disulfide, methylene chloride, ethylene chloride, nitrobenzene and the like, but preferably carbon tetrachloride, for a period of one to ten hours, but preferably about two to five hours, at room temperature; treating the reaction mixture with dilute acid and isolating the product by extraction and distillation to produce ethyl(p-cyclohexylphenyl)glyoxylate (II);

B. treating compound II with ethyl haloacetate (chloro, bromo or iodo), but preferably bromo, in the presence of powdered or granular zinc and a catalystic amount of iodine, in a ratio of at least one mole of ethyl haloacetate and 1.5 mole of zinc per mole of compound II in a nonpolar organic solvent, preferably benzene, to produce diethyl 2-hydroxy-2-(p-cyclohexylphenyl)-succinate (III);

C. heating compound III in the presence of an excess of a strong acid selected from the group comprising polyphosphoric acid, sulfuric acid, phosphoric acid and the like, but preferably polyphosphoric acid, to produce p-cyclohexylphenylmaleic anhydride (IV):

D. hydrogenating compound IV with hydrogen in the presence of a metal catalyst, preferably Raney nickel, in an organic solvent, preferably ethyl acetate, to produce p-cyclohexylphenylsuccinic anhydride (V);

E. treating compound V with a Lewis acid catalyst preferably aluminum chloride in a ratio of one mole of compound V to at least two moles of aluminum chloride in an inert organic solvent, but preferably methylene chloride, to produce (±)-5-cyclohexyl-3-oxo-1-indancarboxylic acid (VI); and F. reducing compound VI by hydrogenation in the presence of a catalyst selected from the group comprising palladium, platinum, nickel, ruthenium and rhodium, in an organic solvent, or by treatment with concentrated hydrochloric acid in the presence of amalgamated zinc (Clemmensen reaction) at reflux temperatures to produce compound I.

The resolution of (±)-5-cyclohexyl-1-indancarboxylic acid can be accomplished according to the following procedure:

A. (±)-5-cyclohexyl-1-indancarboxylic acid: A solution of (±)-5-cyclohexyl-1-indancarboxylic acid (15.0 grams, 0.0614 mole) and cinchonidine (9.05 grams, 0.037 mole) in absolute ethanol (700 ml.) was boiled down to a volume of about 300 ml. The mixture was allowed to cool slowly and was left for 20 hours at 25° C. The colorless crystals were collected and washed with cold ethanol to give the cinchonidine salt of (+)-5-cyclohexyl-1-indancarboxylic acid (13.0 grams), m.p. 212°–212.5° C. Additional cinchonidine (1.0 gram, 0.0034 mole) was added to the mother liquors and their volume reduced to about 165 ml. by boiling. The hot solution was seeded with the salt of the (+) acid and stored at 5° C. for 65 hours, when an additional crop (2.4 grams) of the cinchonidine salt of the (+) acid, m.p. 211°–215° C. was obtained. The mother liquors were retained for isolation of the (−) isomer.

The salt with m.p. 212°–212.5° C. was recrystallized from ethanol to give colorless crystals (11.8 grams), m.p. 217.5°–219° C. The product was partitioned between ether (500 ml). and 10 percent aqueous hydrochloric acid (250 ml). and water saturated with sodium chloride (250 ml.). The ethereal solution was dried ($Na_2SO_4$), filtered, and the filtrate reduced to dryness to give (+)-5-cyclohexyl-1-indancarboxylic acid (5.5 grams), m.p. 108°–110° C. Two recrystallizations from petroleum ether (b.p. 39°–50° C.), gave colorless needles, m.p. 108°–109.5° C., $[\alpha]_D^{25}$ +9.60° (ethanol) and $[\alpha]_{365}^{25}$ +44.8° (ethanol).

Anal. calc'd. for $C_{16}H_{20}O_2$ (percent): C, 78.65; H, 8.25.

Found: C, 78.40; H, 8.27.

B. (−)-5-cyclohexyl-1-indancarboxylic acid: The mother liquors from the salt formation in part A.) were reduced to dryness and the residue treated with ether and 10 percent aqueous hydrochloric acid as previously described for the salt of the (+) isomer and from the ethereal layer was obtained a partially resolved mixture of acids (7.6 grams), enriched in the (−) isomer, $[\alpha]_D^{25}$ −7.69° (ethanol) and $[\alpha]_{365}^{25}$ −35.4° (ethanol).

This mixture was extracted with boiling petroleum ether (b.p. 39°–50° C., 3 × 35 ml.) and the combined extracts were reduced in volume (50 ml.) and cooled in an ice bath. The crystalline solid (5.1 grams), m.p. 105°–108° C., $[\alpha]_D^{25}$ −8.91° (ethanol) and $[\alpha]_{365}^{25}$ −41.5° (ethanol) was collected.

The solution of this acid (5.02 grams, 0.0205 mole) and dehydroabietylamine (5.85 grams, 0.0205 mole) in ethanol (500 ml.) was boiled down to a volume of about 175 ml. and cooled to 25° C. during 2 hours. The dehydroabietylamine salt of (−)-5-cyclohexyl-1-indancarboxylic acid (8.7 grams), m.p. 179°–181° C., was collected and recrystallized from ethanol to give colorless crystals (8.0 grams), m.p. 184°–185° C. The mother liquors from the product with M.P. 179°–181° C., were reduced in volume and an additional crop of salt (0.95 gram), m.p. 178.5°–180.5° C., was isolated. This latter material was recrystallized from ethanol and the product (0.78 gram), m.p. 182°–183° C., was combined with the main crop. The dehydroabietylamine salt (8.78 grams) was partitioned between ether (400 ml.) and 10 percent aqueous hydrochloric acid. The ethereal solution was washed with water (3 × 150 ml.) followed by water saturated with sodium chloride (2 × 100 ml.), dried ($Na_2SO_4$), and reduced to dryness to leave the (−) isomer (4.0 grams). Recrystallization from petroleum ether (B.P. 39°–50° C.) gave colorless needles (3.41 grams) of (−)-5-cyclohexyl-1-indancarboxylic acid: m.p. 108°–109.5° C., $[\alpha]_D^{25}$ −9.66° (ethanol) and $[\alpha]_{365}^{25}$ −44.7° (ethanol).

Anal. calc'd. for $C_{16}H_{20}O_2$ (percent): C, 78.65; H, 8.25.

Found: C, 78.85; H, 8.31.

A preferred embodiment of the present invention is the process for the preparation of compounds having the formula

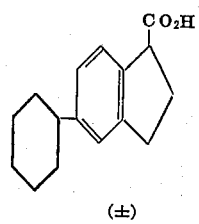

(±)     I which process comprises the consecutive steps of

A. mixing ethyl oxalyl halide in which the halide is Cl, Br or iodo, and cyclohexylbenzene, in a ratio of at least 1 mole of oxalyl halide per mole of cyclohexylbenzene, in the presence of a Lewis acid catalyst, in a ratio of at least 1 mole of catalyst per mole of cyclohexylbenzene, in the presence of an organic solvent essentially inert to the reaction conditions, at about room temperature, for at least 2 hours, to produce the compound having the formula

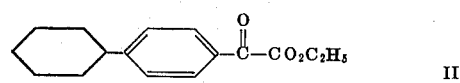

II

B. mixing compound II with an ethyl haloacetate in which halo is Cl, Br or iodo, in the presence of granular or powdered zinc, and a catalytic amount of iodine, in a ratio of at least 1 mole of ethyl haloacetate and 1.5 mole of zinc per mole of compound II, in a nonpolar organic solvent essentially inert to the reaction conditions, with the aid of heat, to produce the compound having the formula

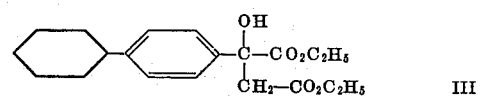

III

C. heating compound III in the presence of an excess of a strong acid to produce the compound having the formula

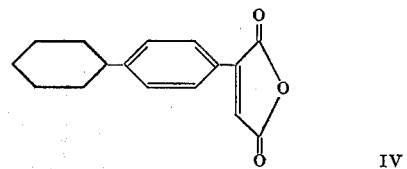

IV

D. hydrogenating compound IV to produce the compound having the formula

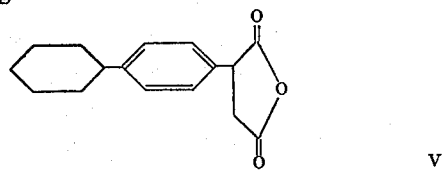

V

E. treating compound V with a Lewis acid catlyst in a ratio of one mole of compound V to at least two moles of catalyst, in an organic solvent essentially inert to the reaction conditions, to produce the compound having the formula

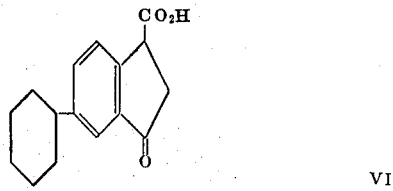

VI

F. reducing compound VI.

A more preferred embodiment is the process for the preparation of compound I which comprises the consecutive steps of A. mixing ethyl oxalyl halide in which the halide is Cl, Br or I, and cyclohexylbenzene in a ratio of at least 1 mole of oxalyl halide per mole of cyclohexylbenzene, in the presence of a Lewis acid catalyst selected from the group comprising $AlCl_3$, $SnCl_4$, $FeCl_3$, $TCl_4$ and $ZnCl_2$, in a ratio of at least 1 mole of catalyst per mole of cyclohexylbenzene, in the presence of an organic solvent selected from the group comprising carbon tetrachloride, carbon disulfide, methylene chloride, ethylene chloride and nitrobenzene, at about room temperature, for at least 2 hours, to produce compound II;

B. mixing compound II with an ethyl haloacetate in which halo is Cl, Br or I, in the presence of granular or powdered zinc, and a catalystic amount of iodine, in a ratio of at least 1 mole of ethyl haloacetate and 1.5 mole of zinc per mole of compound II, in an organic solvent selected from the group comprising benzene, toluene, xylene, ether, tetrahydrofuran and dioxane, with the aid of heat, produce compound III;

C. heating compound III in the presence of an excess of strong acid selected from the group comprising sulfuric, phosphoric and polyphosphoric acid, to produce compound IV;

D. hydrogenating compound IV with hydrogen in the presence of a metal catalyst selected from the group comprising Raney nickel, platinum, palladium, ruthenium and rhodium, in an organic solvent selected from the group comprising ethyl acetate, ethanol, methanol, dimethylacetamide, dimethylformamide, and tetrahydrofuran, to product compound V;

E. treating compound V with a Lewis acid catalyst selected from the group comprising aluminum chloride, $SnCl_4$, $FeCl_3$, $TiCl_4$ and $ZnCl_2$, in a ratio of 1 mole of compound V to at least two moles of Lewis acid, in an inert organic solvent selected form the group comprising carbon tetrachloride, carbon disulfide, methylene chloride, ethylene chloride and nitrobenzene, at about room temperature; and F. reducing compound VI by hydrogenation in the presence of a catalyst selected from the group comprising palladium, platinum, nickel, ruthenium and rhodium, in an organic solvent; or by treatment with concentrated hydrochloric acid and amalgamated zinc, at about reflux temperature.

A most preferred embodiment is the process for the preparation of compound I, which process comprises the consecutive steps of A. mixing ethyl oxalyl chloride, cyclohexylbenzene and aluminum chloride in a molar ratio of about 1:1:1.2 in carbon disulfide or carbon tetrachloride, at about room temperature, for about 2 to 5 hours, to produce compound II;

B. mixing compound II, ethyl bromoacetate and powdered or granular zinc in a molar ration of about 1:1:1.5, in the presence of a catalytic amount of iodine, in benzene, at about reflux temperature, to produce compound III;

C. heating compound III in a large excess of polyphosphoric acid, at about 90°-110° C., for one to 3 hours, to produce compound IV;

D. hydrogenating compound IV with hydrogen in the presence of Raney nickel, in ethyl acetate, at about room temperature, at a hydrogen pressure of about 25 to 100 p.s.i., until one equivalent of hydrogen is consumed, to produce compound V;

E. treating compound V with $AlCl_3$ in about a 1:2.5 molar ratio, in methylene chloride, carbon tetrachloride or carbon disulfide, at about room temperature, for about 10 to 30 hours, to produce compound VI; and F. reducing compound VI by hydrogenation with 10 percent palladium on charcoal in glacial acetic acid, with a catalytic amount of perchloric acid, at about room temperature, till no further hydrogen is absorbed.

EXAMPLES OF THE EMBODIMENTS

EXAMPLE 1

Ethyl(p-cyclohexylphenyl)glyoxylate[1]

A solution of ethyl oxalyl chloride (25.0 g., 0.183 moles) and cyclohexylbenzene (29.3 g., 0.183 mole) in carbon tetrachloride (32 ml.) was added dropwise over a period of 1 hour to a stirred, ice-cooled, slurry of aluminum chloride (29.0 g., 0.22 mole) in carbon tetrachloride (90 ml.).

The resulting viscous, brown mixture was stirred, with icecooling for 1.5 hour, then at room temperature for 6 hours.

The reaction flask was cooled in ice and cold 4N hydrochloric acid (250 ml.) was added cautiously while the residue was broken up. Carbon tetrachloride (100 ml.) was added and the mixture shaken and separated. The organic layer was washed with 2N hydrochloric acid (200 ml.), 2.5 percent aqueous sodium carbonate (400 ml.), and water (200 ml.); then dried (sodium sulfate) and concentrated on a rotary evaporator to give an orange liquid.

The liquid was distilled under reduced pressure to give:

Fraction (1) Cyclohexylbenzene (5.5 g.) b.p. 40°–41 °/0.15 mm.

Fraction (2) Ethyl(p-cyclohexylphenyl)glyoxylate (29.4 g., 62 percent[2]) b.p. 133°–143°/0.15 mm.

1. Previously reported by K. Kindler, W. Metzendorf, and D. Kwok. Ber. 76B, 308 (1943), [Chem. Abs. 37, 5709 (1943)].

2. A higher yield was obtained when the reaction was carried out on a larger scale. K. Kindler et al. (note 1) reported at 76 percent yield.

EXAMPLE 2

Diethyl 2-hydroxy-2-(p-cyclohexylphenyl) succinate[3]

A solution of ethyl bromoacetate (19.0 g., 0.114 mole) in benzene (30 ml.) was added[4] to a stirred mixture of 20 mesh granular zinc (10.8 g., 0.165 mole), zinc dust (100 mg.), iodine (10 mg.), and ethyl(p-cyclohexylphenyl)glyoxylate (29.3 g., 0.112 mole) in benzene (60 ml.). With stirring continued, the mixture was heated under reflux for 3.5 hours[5].

The resulting brownish solution was decanted from the remaining zinc. The zinc was washed with benzene (100 ml.) and the combined benzene solutions were washed with 5N hydrochloric acid (150 ml.), 3N hydrochloric acid (150 ml.), 5 percent aqueous sodium bicarbonate (2 × 120 ml.), and water (150 ml.).

The benzene solution was dried (sodium sulfate) and the solvent removed on a rotary evaporator to give the product as a yellow, crystalline solid[6] (36.3 g.[7]), which was used directly in the next reaction.

3. For similar Reformatsky reaction, see C. S. Rondestvedt and A. H. Filbey, Jr. Org. Chem. 19, 119 (1954).

4. When carried out on a very large scale, it may be necessary to add the ethyl bromoacetate slowly since the reaction is mildly exothermic.

5. The reaction is probably complete after less than 2 hours under reflux.

6. The product may be recrystallized from n-hexane to give colorless needles, m.p. 91°–92°.

7. The nuclear magnetic resonance (n.m.r.) spectrum of the product indicated approximately 97 percent purity; 90 percent yield.

EXAMPLE 3 p-Cyclohexylphenylmaleic anhydride

A mixture of crude diethyl-2-hydroxy-2-(p-cyclohexylphenyl) succinate (36.2 g., 0.104 mole) and polyphosphoric acid (450 g.) was stirred with heating on a steam bath for 2.25 hours.

The resulting brown mixture was cooled in ice and mixed with ice-water (750 ml.) and benzene (500 ml.). The mixture was shaken and separated. The aqueous layer was extracted with benzene (150 ml.) and the combined benzene layers were washed with dilute aqueous sodium chloride (2 × 200 ml.), then dried (sodium sulfate), and treated with charcoal.

The solvent was removed on a rotary evaporator to give the product as a yellow-brown, crystalline solid[8] (26.8 g.[9]), which was used directly in the next reaction.

8. The product may be recrystallized from cyclohexane to give buff needles, m.p. 123°–125° C.

9. The n.m.r. spectrum of the product indicated approximately 90 percent purity; 90 percent yield.

EXAMPLE 4 p-Cyclohexylphenylsuccinic anhydride

To a solution of p-cyclohexylphenylmaleic anhydride (26.6 g. containing approximately 0.094 mole) in ethyl acetate (270 ml.), was added Raney nickel (approximately 3g.). The mixture was hydrogenated[10] on a Parr shaker at room temperature and 55 p.s.i. until one equivalent of hydrogen had been consumed.

The catalyst was filtered off and the solution was washed with 2N hydrochloric acid (150 ml.) and aqueous sodium chloride (100 ml.) and then dried (sodium sulfate). The solvent was removed on a rotary evaporator to give the product as a brownish crystalline mass (25.4 g.[11]).

10. For a similar hydrogenation of phenyl maleic anhydride; see: C. A. Miller, Chem. Abs. 57, P11112 (1962).

11. The n.m.r. spectrum of the product indicated it to be approximately 90 percent pure. Taking into account the level of impurity in the starting material, the yield is about 95%.

EXAMPLE 5

(±)-5-cyclohexyl-3-oxo-1-indancarboxylic acid

A solution of p-cyclohexylphenylsuccinic anhydride (33.0 g., 0.128 mole) in dry methylene chloride (400 ml.) was added dropwise to a stirred, cooled (ice-water) suspension of aluminum chloride (37.4 g., 0.281 mole) in methylene chloride (400 ml.) [H. O. House, F. J. Sauter, W. G. Kenyon, and J. J. Riehl, J. Org. Chem., 33, 957 (1968)].

The mixture was stirred with cooling for 1 hour, and was then stirred at room temperature for 24 hours. The reaction mixture was reduced to dryness and the residue triturated with ice-water (500 ml.) and concentrated hydrochloric acid (30 ml.). The resulting gummy suspension was stirred for thirty-six hours at room temperature. The mixture was filtered and the collected off-white solid dried under vacuum. The solid was recrystallized from cyclohexane to give (±)-5-cyclohexyl-3-oxo-1-indancarboxylic acid (30.4 g., 92 percent as off-white crystals, m.p. 117°–118° C. A portion of the product was recrystallized (with charcoal treatment) from cyclohexane to give colorless crystals, m.p. 117°–118° C.

Anal. calc'd. for $C_{16}H_{18}O_3$ (percent): C, 74.39; H, 7.02.

Found: C, 74.29; H, 7.23.

EXAMPLE 6

(±)-5-cyclohexyl-1-indancarboxylic acid

A solution of (±)-5-cyclohexyl-3-oxo-1-indancarboxylic acid (9.0 g.) in glacial acetic acid (150 ml.) containing 60 percent perchloric acid (2 ml.) and 10 percent palladium on carbon (2.0 g.) was shaken with hydrogen (Parr hydrogenator, 3 atms.) until no further hydrogen was absorbed. The mixture was filtered and anhydrous sodium acetate (2.5 g.) was added to the filtrate. The resulting solution was reduced to dryness. Several portions of toluene were added to the residue and after each addition the mixture was evaporated. The residue was partitioned between diethyl ether (200 ml.) and water (40 ml.). The ether layer was washed with water (40 ml.) followed by saturated aqueous sodium chloride (40 ml.), and dried (sodium sulfate). The solution was reduced to dryness to yield a buff solid which was recrystallized from Skellysolve B to give (±)-5-cyclohexyl-1-indancarboxylic acid (8.4 g., 98.5 percent) as buff crystals, m.p. 145°–147° C. A portion of the product was recrystallized from Skellysolve B (essentially n-hexane, b.p. 60°–68° C.), with charcoal treatment, to give colorless crystals, m.p. 147°–148° C.

Anal. calc'd. for $C_{16}H_{20}O_2$ (percent): C, 78.65; H, 8.25.

Found: C, 78,58; H, 8.34.

We claim:

1. The process for the preparation of the compound having the formula

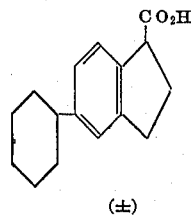

(±)   I which process comprises the consecutive steps of
A. mixing ethyl oxalyl halide in which the halide is Cl, Br or iodo, and cyclohexylbenzene, in a ratio of at least one mole of oxalyl halide per mole of cyclohexylbenzene, in the presence of a Lewis acid catalyst, in a ratio of at least one mole of catalyst per mole of cyclohexylbenzene, in the presence of an organic solvent essentially inert to the reaction conditions, at about room temperature, for at least 2 hours, to produce the compound having the formula

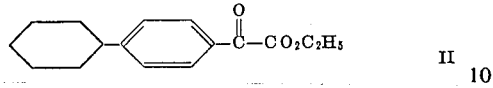

B. mixing compound II with an ethyl haloacetate in which halo is Cl, Br or iodo, in the presence of granular or powdered zinc, and a catalytic amount of iodine, in a ratio of at least 1 mole of ethyl haloacetate and 1.5 mole of zinc per mole of compound II, in a nonpolar organic solvent essentially inert to the reaction conditions, to produce the compound having the formula

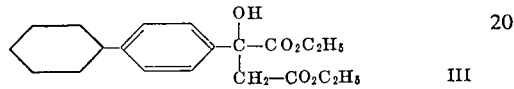

C. heating compound III in the presence of an excess of a strong acid to produce the compound having the formula

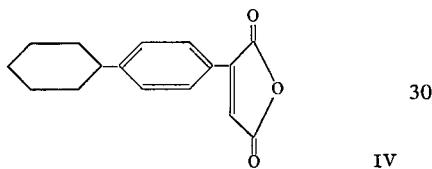

D. hydrogenating compound IV to produce the compound having the formula

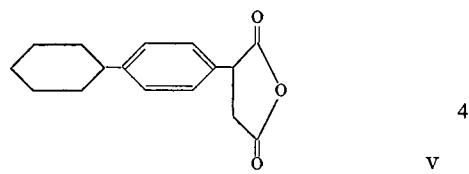

E. treating compound V with a Lewis acid catalyst in a ratio of 1 mole of compound V to at least 2 moles of catalyst, in an organic solvent essentially inert to the reaction conditions, to produce the compound having the formula

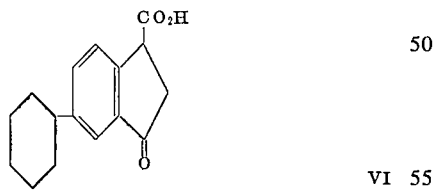

F. reducing compound VI.

2. The process of claim 1 which process comprises the consecutive steps of

A. mixing ethyl oxalyl halide in which the halide is Cl, Br or I, and cyclohexylbenzene, in a ratio of at least 1 mole of oxalyl halide per mole of cyclohexylbenzene, in the presence of a Lewis acid catalyst selected from the group comprising $AlCl_3$, $SnCl_4$, $FeCl_3$, $TiCl_4$ and $ZnCl_2$, in a ratio of at least 1 mole of catalyst per mole of cyclohexylbenzene, in the presence of an organic solvent selected from the group comprising carbon tetrachloride, carbon disulfide, methylene chloride, ethylene chloride and nitrobenzene, at about room temperature, for at least 2 hours, to produce compound II;

B. mixing compound II with an ethyl haloacetate in which halo is Cl, Br, or I, in the presence of granular of powdered zinc, and a catalytic amount of iodine, in a ratio of at least 1 mole of ethyl haloacetate and 1.5 mole of zinc per mole of compound II, in an organic solvent selected from the group comprising benzene, toluene, xylene, ether, tetrahydrofuran and dioxane, to produce compound III;

C. heating compound III in the presence of an excess of strong acid selected form the group comprising sulfuric, phosphoric and polyphosphoric acid, to produce compound IV;

D. hydrogenating compound IV with hydrogen in the presence of a metal catalyst selected from the group comprising nickel, platinum, palladium, ruthenium and rhodium, in an organic solvent selected from the group comprising ethyl acetate, ethanol, methanol, dimethylacetamide, dimethylformamide, and tetrahydrofuran, to produce compound V;

E. treating compound V with a Lewis acid catalyst selected from the group comprising aluminum chloride, $SnCl_4$, $FeCl_3$, $TiCl_4$ and $ZnCl_2$, in a ratio of 1 mole of compound V to at least 2 moles of Lewis acid, in an inert organic solvent selected form the group comprising carbon tetrachloride, carbon disulfide, methylene chloride, ethylene chloride and nitrobenzene, at about room temperature; and F. reducing compound VI by hydrogenation in the presence of a catalyst selected from the group comprising palladium, platinum, nickel, ruthenium and rhodium, in an organic solvent, or by treatment with concentrated hydrochloric acid and amalgamated zinc, at reflux temperature.

3. The process of claim 1 which comprises the consecutive steps of

A. mixing ethyl oxalyl chloride, cyclohexylbenzene and aluminum chloride in a molar ratio of about 1:1:1.2, in carbon disulfide or carbon tetrachloride, at about room temperature, for about two to five hours, to produce compound II;

B. mixing compound II, ethyl bromoacetate and powdered or granular zinc in a molar ratio of about 1:1:1.5, in the presence of a catalytic amount of iodine, in benzene, to produce compound III;

C. heating compound III in a large excess of polyphosphoric acid, at about 90°–110° C., for one to three hours, to produce com-pound IV;

D. hydrogenating compound IV with hydrogen in the presence of Raney nickel, in ethyl acetate, at about room temperature, at a hydrogen pressure of about 25 to 100 p.s.i., until one equivalent of hydrogen is consumed, to produce compound V;

E. treating compound V with $AlCl_3$ in about a 1:2.5 molar ratio, in methylene chloride, carbon tetrachloride or carbon disulfide, at about room temperature, for about 10 to 30 hours, to produce compound VI; and F. reducing compound VI by hydrogenation with palladium on charcoal, in glacial acetic acid, with a catalytic amount of perchloric acid, at about room temperature, till no further hydrogen is absorbed.

* * * * *